United States Patent [19]

Baker et al.

[11] Patent Number: 4,523,054

[45] Date of Patent: Jun. 11, 1985

[54] LINE-PAST INSULATOR SUPPORT SYSTEM, METHOD OF ASSEMBLY THEREOF, AND CLAMP FOR USE THEREIN

[75] Inventors: Anthony C. Baker, Rochester; Thomas A. Pinkham, LeRoy, both of N.Y.

[73] Assignee: Interpace Corporation, Purchase, N.Y.

[21] Appl. No.: 482,039

[22] Filed: Apr. 4, 1983

[51] Int. Cl.³ ........................ H02G 7/20; H01B 17/16; H01B 17/38

[52] U.S. Cl. .................................... 174/45 R; 24/459; 29/428; 174/148; 174/190

[58] Field of Search ...................... 174/40 R, 43, 45 R, 174/141 R, 148, 149 R, 150, 161 R, 163 R, 172, 190, 191; 24/284, 459, 569

[56] References Cited

U.S. PATENT DOCUMENTS

| | | | |
|---|---|---|---|
| 1,602,873 | 10/1926 | Ansingh | 174/191 X |
| 2,311,486 | 2/1943 | Swearingen | 174/172 |
| 2,364,982 | 12/1944 | Kaufmann | 24/284 X |
| 3,566,011 | 2/1971 | Pinkham et al. | 174/169 |
| 3,975,580 | 8/1976 | Lewis | 174/45 R |

*Primary Examiner*—Laramie E. Askin

*Attorney, Agent, or Firm*—Charles E. Baxley

[57] ABSTRACT

An auxiliary support system for use with a line-post insulator of an electric power transmission system includes a tension member of electrically insulating material coupled between a tower and the junction of a conductor support with the outboard terminus of the line-post insulator. A clamp formed of two juxtaposed jaws bends downwards to clear the conductor and support, and then bends inwardly to grip the terminus and secure it to the tension member. Attachment of the auxiliary support can be accomplished without disruption of the electric power.

10 Claims, 6 Drawing Figures

LINE-PAST INSULATOR SUPPORT SYSTEM, METHOD OF ASSEMBLY THEREOF, AND CLAMP FOR USE THEREIN

BACKGROUND OF THE INVENTION

This invention relates to electric power transmission and, more particularly, to an auxiliary support for a horizontal line-post insulator which positions an electrical conductor relative to a supporting tower.

In the transmission of electrical power, towers or poles are used to carry electrical conductors high above the ground. In one type of construction, the conductors are spaced from a tower by horizontal line-post insulators which are fabricated, particularly, of a series of porcelain insulator sections.

In one form of this construction, the electrical conductors are connected to the outboard ends of the respective insulators by a structure, which may be referred to as a basket, which is secured at the outer end of the line-post insulator and includes a loop which encircles the conductor. The insulator is provided with a clamp that is tightly secured to the conductor and is attached by means of shear pins to the basket. In service, if loads exceeding the design loads plus a safety factor are applied to the insulator, the strength of the insulator may be exceeded and the insulator or its mountings to the tower may be damaged. To protect against such cause of damage, the shear pins fracture at a predetermined magnitude of force, so as to free the clamp and allow the conductor with the clamp to slide freely through the loop of the basket. Such an arrangement has proven satisfactory in protection of the line-post insulator under a variety of service overloads.

However, a hazard still exists in that vertical overloads, which include the weight of the cable, may be sufficiently strong so as to break the line-post insulator. While the foregoing arrangement of the shear pins is useful in the protection of horizontally directed forces, the arrangement may not provide a sufficient level of protection against vertically directed forces under some conditions. As a result, there have been some failures of power transmission systems wherein, after the breakage of one line-post insulator, the additional weight of the electrical conductor resulting from the loss of the line-post insulator is then transferred to the insulator of a neighboring tower which then also fails. Thus a series of failures may develop in the manner of a cascade in which many line-post insulators are damaged, and wherein the electrical conductor may fall to the ground. In the design of transmission lines, distances between points of support (span length) may be limited to ensure that conductor vertical loads on the insulators do not exceed the strength of the insulators for the given number of assumed insulator failure points. In addition points of conductor longitudinal restraint (dead ends) may be located so as to contain an occurring cascade failure and thus limit the event damage.

However, for existing transmission lines the above remedies are not practical due to expense and space limitations. A further problem arises in that, should it be desired to alter the construction of the towers in a transmission system so as to afford additional support to the insulators, some means would have to be developed for maintaining the supply of electric power to the users of such power during the refurbishment of the towers.

SUMMARY OF THE INVENTION

The foregoing problems are overcome and other advantages are provided by an auxiliary support for a horizontal line-post insulator which, in accordance with the invention, can be attached to the line-post insulator without a disruption of the electric power. The additional support connects with the outer end of the line-post insulator adjacent the junction of the electrical conductor and the line-post insulator. It is recognized that in the use of a cable support such as a basket at the junction of the conductor and the line-post insulator, little space is available for the insertion of any mechanical support. Indeed, in a typical installation, the available space is only a few inches in width and, thus, necessitates the use of a specially designed fitting which can be inserted within this relatively small space without removal of the electrical conductor and without any disruption of the electric power carried by the conductor.

In accordance with the invention, the auxiliary support is so structured as to permit the connection in this relatively small space without the disruption of the electric power. The auxiliary support is formed as an insulating tension member having an upper end which is adapted for attachment to a supporting tower of the transmission system. The lower end of the tension member extends towards a junction of the electrical conductor with the line-post insulator and terminates in a clamp having first and second jaws which pass between the basket support and the terminus of the insulator for gripping the terminus. The two jaws are mirror images of each other as reflected in a plane including the longitudinal axes of the line-post insulator and the tension member. Each jaw has a concave arcuate gripping portion configured for mating with the convex surface of the terminus of the line-post insulator. The curvature of the gripping portion is in a plane normal to the axis of the line-post insulator. Each jaw includes an arm portion positioned between the gripping portion and the tension member, the arm portion being curved about a radius parallel to the foregoing mirror-image plane for clearance of the conductor and the basket. The two jaws thus extend in generally parallel directions from the lower end of the tension member to pass around and engage the terminus of the line-post insulator. After engagement of the line-post insulator, the two jaws are merged together by a set of bolts attached to the tension member for securely holding the terminus of the insulator. Thereby, additional support is provided at the outer end of the line-post insulator, this support being in addition to the support by the tower at the inner end of the line-post insulator.

BRIEF DESCRIPTION OF THE DRAWING

The foregoing aspects and other features of the invention are explained in the following description taken in connection with the accompanying drawing wherein.

DETAILED DESCRIPTION

Figure 1A:
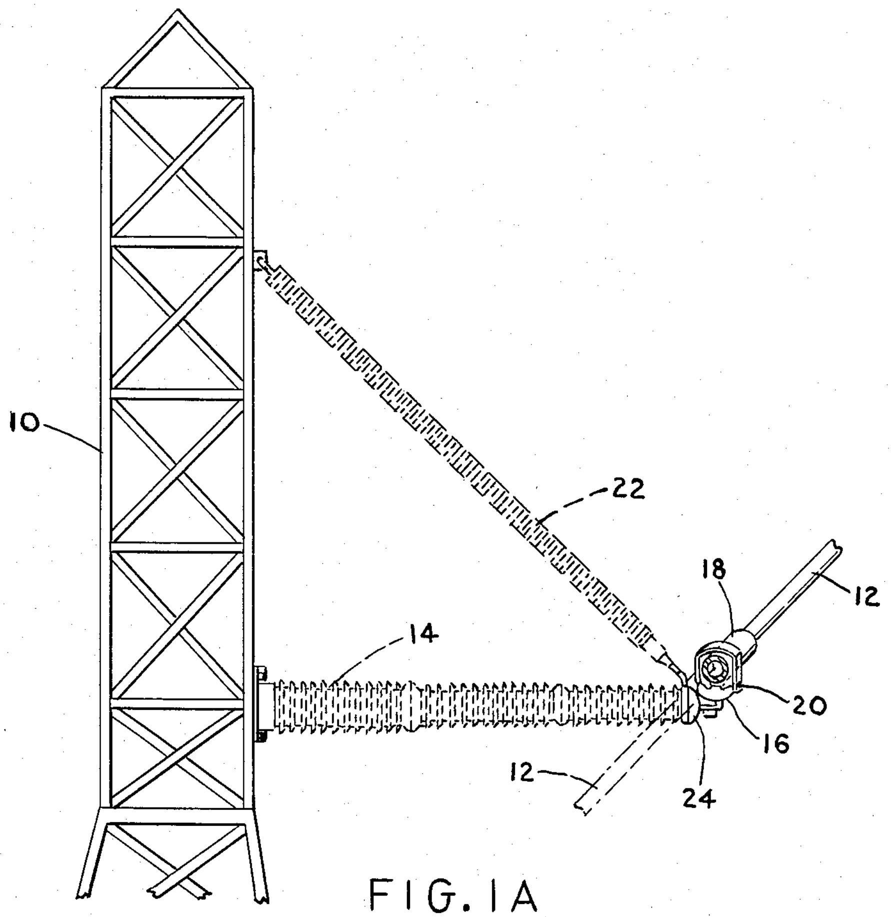
FIG. 1A is a stylized tower showing a cradle, or a basket, with a loop for encircling a conductor.
Figure 1B:
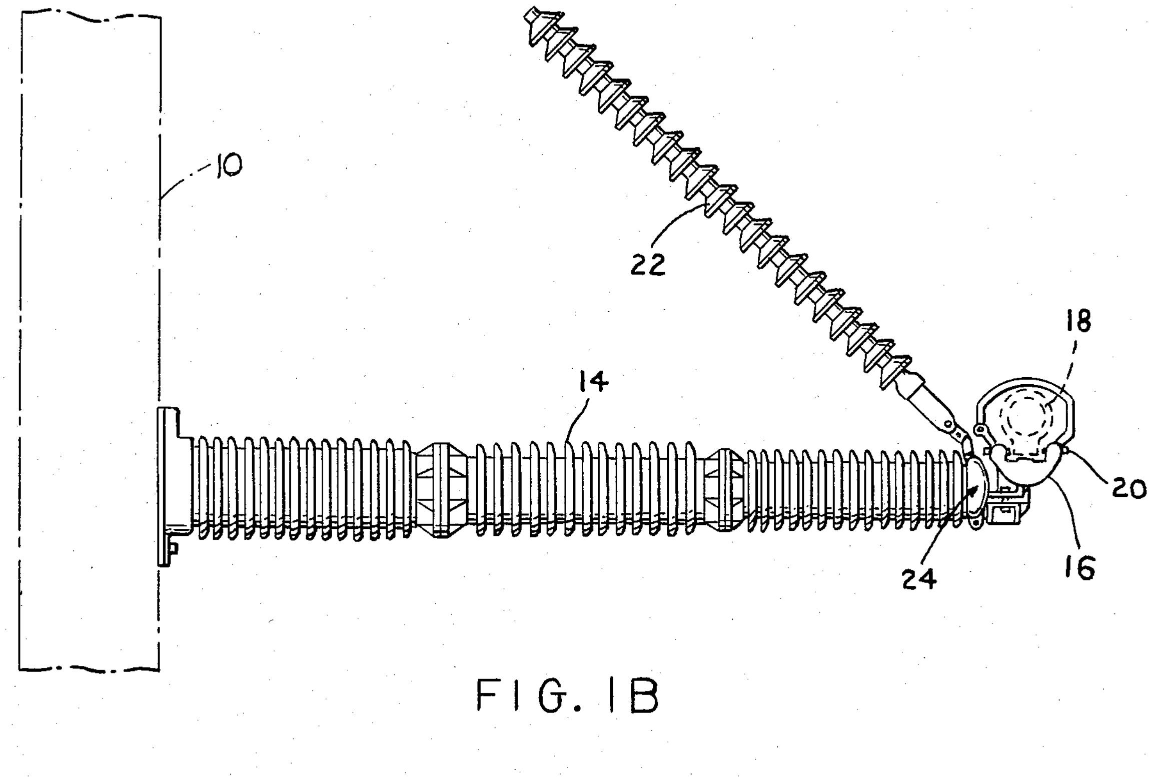
FIG. 1B is an enlarged view of the basket, a line post insulator, and an auxiliary support of the invention as shown in FIG. 1A.

In FIGS. 1A and 1B, a tower or pole 10 carries an electrical conductor 12 at the other end of a horizontal line-post insulator 14 for the transmission of electric power at high voltages. A support to be referred to as a basket 16 is affixed by conventional means to the outer end of the insulator 14 and encircles the conductor 12 to securely support the conductor 12 at the outer end of the insulator 14. A clamp 18 connects the conductor 12 to the basket 16, the clamp 18 being tightly fitted around the conductor 12 and being secured to the basket 16 by shear pins 20. In the event of longitudinal forces in the conductor 12 exceeding the strength of the shear pins, the shear pins 20 fracture in response to the excessive tensile forces in the conductor 12. The conductor 12 and the clamp 18 can then slide through the loop of the basket 16 and thereby protect the insulator 14 and its mounting to the tower 10 from damage due to the excessive tensile forces. Thereby, the known foregoing arrangement protects the insulator 14 from hazards due to forces exerted in a generally longitudinal direction, along the length of the conductor.

In accordance with the invention, protection is provided for forces exerted in a generally vertical direction, such forces being due to the weight of the conductor 12 as well as to vertical movement associated with the dynamic forces of the conductor 12 due to release of the conductor at support points. The invention provides for a tension member 22 which is affixed by conventional means at its upper end to the tower or pole 10, and which terminates at its lower end in a clamp 24 adapted for mating with the outer terminus of the insulator 14. The clamp 24 is specifically configured to be fitted into the space between the basket 16 and the insulator 14 without any disruption of the position of the conductor 12 and without any disruption of the conduction of electrical power by the conductor 12. The unique features of the clamp 24 which permit connection of the member 22 to the terminus of the insulator 14 during the transmission of electric power will now be described.

Figure 2A:
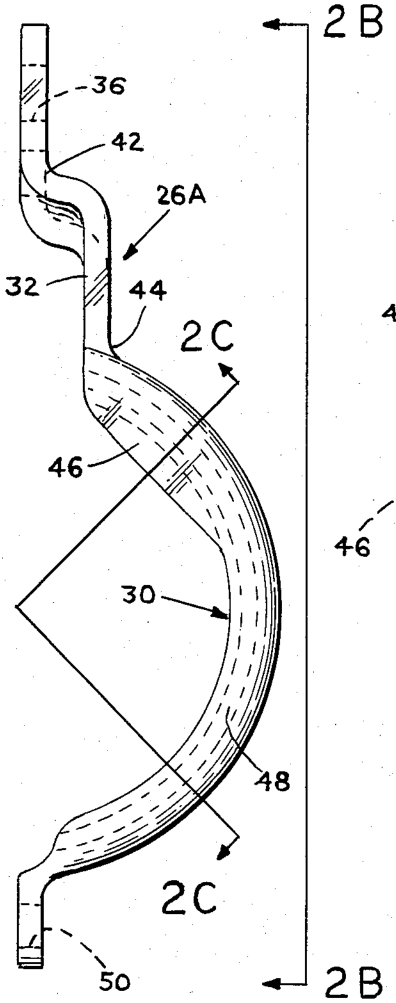
FIG. 2A is an end view of a right half of a supporting clamp of the invention.
Figure 2B:
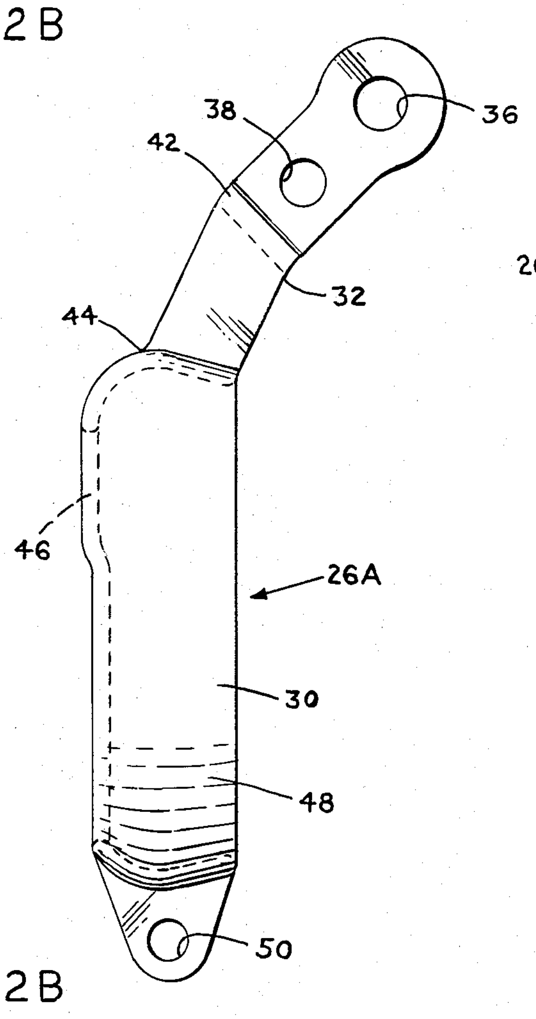
FIG. 2B is a side view of the right half of the support clamp taken along the line 2B—2B of FIG. 2A.
Figure 2C:
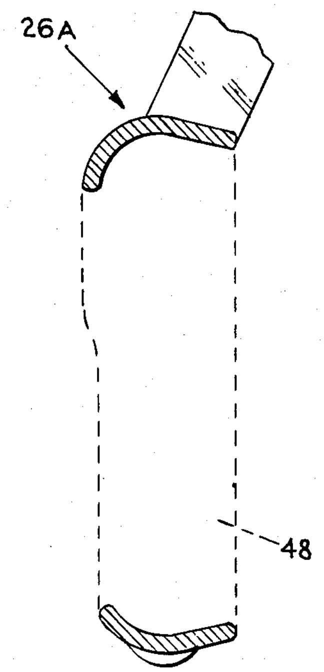
FIG. 2C is a fragmentary sectional view of a support clamp taken along the line 2C—2C in FIG. 2A.

In FIGS. 2A–2C and 3 the clamp 24 is seen to comprise a pair of jaws 26A and 26B, the right jaw being identified as 26A and the left jaw being identified as 26B. In the ensuing description of the jaws 26A-B, the text may be simplified by dropping the legends A and B when the context applies to each of the jaws 26. The two jaws 26 are urged toward each other by bolts 28 (FIG. 3) in order to grasp tightly the terminus of the insulator 14. The bolts 28 also secure the jaws 26 to the lower end of the member 22 as described below. With respect to the shapes of the jaws 26, the jaws 26 are the mirror images of each other as reflected about a first plane containing the longitudinal axes of the member 22 and the insulator 14. Accordingly, the FIGS. 2A–2C show only one of the jaws 26, the right jaw 26A, it being understood that the other jaw 26B has the same structural features. Each jaw 26 includes a gripping portion 30 having a concave arcuate surface which is curved in a second plane normal to the longitudinal axes of the insulator 14 so as to grip the peripheral regions of the surface of the terminus of the insulator 14. Each jaw 26 is further curved in the first plane by an arm 32 so as to clear the basket 16 and the conductor 12, the arm 32 joining the gripping portion 30 to the end of the member 22.

Figure 3:
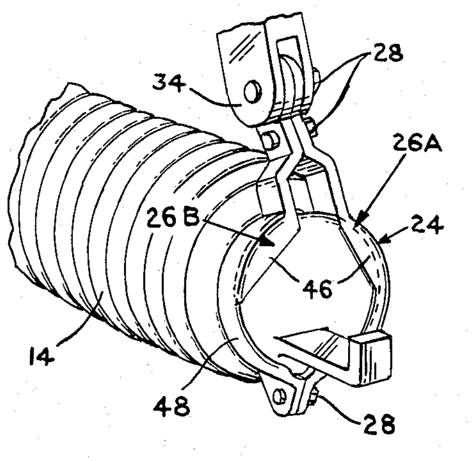
FIG. 3 is a front view of the line-post insulator without the basket and conductor clamp of FIGS. 1A–B showing both jaws of the tension member clamp gripping the terminus of the line-post insulator.

Both of the foregoing curvatures are best seen in the FIGS. 2A–2C while the connection of the clamp 24 to the clevis end-fitting 34 of member 22 is best seen in FIG. 3. Connection of the clamp 24 to the lower end of the member 22 is accomplished by an end-fitting 34 which is bifurcated to envelop the ends of the arms 32 to facilitate the positioning of the jaws 26 by a repairman standing in an insulated mobile support (of conventional design, not shown). One of the bolts 28 passes through aperture 36 of the arms 32 into the end-fitting 34 for holding the arms securely in the end-fitting 34, while a second one of the bolts 28 passes through apertures 38 in the arms 32 for urging the arms 32 together. Each arm 32 is provided with an inner bend at 42 and an outer bend at 44, the two bends spacing apart the lower portions of the arms 32 to permit a flexing of the arms 32 for better tightening against the insulator 14.

The concavity in the gripping portion 30 of a jaw 26 terminates in a lip 46 which extends partially over the front face of the terminus of the insulator 14 while allowing space for the connection between the insulator 14 and the basket 16. A shoulder 48 of the concavity presses against the side surface of the terminus of the insulator 14. The thickness of the lip 46 is approximately one-quarter inch for adequate strength while providing adequate clearance between the basket 16 and the terminus of the insulator 14. A third one of the bolts 28 passes through apertures 50 at the bottoms of the gripping portions 30 to complete the securing of the clamp 24 to the insulator 14.

In operation, the upper end of the member 22 is affixed to the tower or pole 10 and the lower end is brought to the terminus of insulator 14. In a typical installation, the member 22 is formed of an electrically insulating material such as a synthetic rubber polymer surrounding a resinous rod reinforced with fibrous glass, the member 22 being ten feet long and approximately $4\frac{1}{2}$ inches in diameter with a weight of 25 pounds, and having a series of water sheds along its outer surface. A string of porcelain disc or rod insulators, commonly called suspension insulators, may also be used for the insulating tensile member.

The arms 32 are gathered into the end-fitting 34 and the gripping portions 30 are positioned between the insulator 14 and the basket 16. The bolts 28 are inserted for securing the clamp 24 to the end-fitting 34 and to the terminus of the insulator 14. All of the foregoing installation steps are readily accomplished while the conductor is carrying electric power. The member 22 has sufficient strength to support the insulator 14 in the event of a fracture of the insulator due to any reason. Thereby, the invention permits modification of an existing transmission system, concurrently with the transmission of electric power, to provide increased safety from dropping of a section of the conductor 12 at a tower 10 plus the further damaging effect of a cascade.

It is to be understood that the above described embodiment of the invention is illustrative only and that modifications thereof may occur to those skilled in the art. Accordingly, this invention is not be regarded as limited to the embodiment disclosed herein, but is to be limited only as defined by the appended claims.

We claim:

1. An electric power transmission system comprising:

a tower and an electrical conductor;

a line-post insulator extending horizontally from said tower and supporting said conductor at an outer terminus of said line-post insulator away from said tower;

an insulating tension member extending outwardly and downwardly from said tower to meet the outer terminus of said line-post insulator;

means for securing said conductor adjacent said outer terminus of said line-post insulator, said terminus of said line-post insulator having a generally convex surface;

a clamp secured to said tension member, said clamp comprising:

a first jaw and a second jaw passing between said conductor and said line-post insulator for engagement with said convex surface, said second jaw being the mirror image of said first jaw as reflected about a plane including axes of said line-post insulator and said tension member, each of said jaws having a concave arcuate gripping portion configured for mating with said convex surface of said terminus, said gripping portions of said first and said second jaws contacting said convex surface on opposite sides of said plane, each of said jaws having an arm portion curved about a line perpendicular to said plane for clearing said conductor, said arm portions extending from said gripping portions of respective ones of said jaws to a point of engagement of said clamp with said tension member; and urging means for urging said jaws together for secure engagement of said gripping portions of said jaws with said outer terminus of said line-post insulator.

2. A system according to claim 1 wherein said gripping portions of respective ones of said jaws are curved in a second plane, normal to a longitudinal axis of said line-post insulator.

3. A system according to claim 2 wherein in each of said gripping portions, a concavity terminates in a lip and a shoulder, said lip being shaped for contacting a front of said convex surface and said shoulder being shaped for contacting a side of said convex surface of said line-post insulator.

4. A system according to claim 3 wherein an arm of each of said jaws is provided with an inner bend and an outer bend to displace a lower portion of said arm in one jaw from the corresponding portion of the other jaw thereby providing space for tightening one jaw against the other jaw.

5. A system according to claim 4 wherein said urging means includes a set of bolts connecting from one of said jaws to the other of said jaws.

6. A system according to claim 1 wherein said securing means comprises a basket support configured for encirclement of said conductor, said conductor being attached to the basket by means of shear pins.

7. In an electric power transmission system comprising:

a tower and an electrical conductor;

a line-post insulator extending horizontally from said tower and supporting said conductor at an outer terminus of said line-post insulator away from said tower;

a method of securing said outer terminus of said line-post insulator to said tower during a state of power flow through said conductor comprising:

extending an electrically-insulating tension member from said tower to said terminus;

securing a clamp to an outer end of said tension member, said clamp comprising a pair of opposed jaws, each of said jaws including an arm portion extending toward said tension member;

positioning said clamp between said conductor and said terminus, said positioning including a spacing of said jaws on opposite sides of said insulator at said terminus; and urging said jaws together while orienting a bend in each of said arm portions of said jaws for providing clearance of said conductor and connection of said tension member with said terminus.

8. A clamp for securing the outer end of a horizontal line-post insulator of an electric power transmission system comprising:

a first jaw and a second jaw, said second jaw being the mirror image of said first jaw as reflected about a central plane of said clamp, each of said jaws having a concave arcuate gripping portion configured for mating with a convex surface of an outer end of said line-post insulator, the concave portions of each of said jaws facing said central plane to permit said first jaw and said second jaw to contact opposite sides of the outer end of said line-post insulator, each of said jaws having an arm portion curved about a line perpendicular to said plane to provide clearance of an electrical conductor at the outer end of said line-post insulator, said arm portions extending from said gripping portions of respective ones of said jaws to permit engagement with a tension member of a power transmission system; and urging means for urging the arm portions of said first and said second jaws toward each other to permit secure engagement of said gripping portions of said jaws with said outer end of said line-post insulator.

9. A clamp for engagement with the outer end of a horizontal line-post insulator in an electric power transmission system wherein a tension member extends between a tower of the system and the outer end of the line-post insulator, the clamp comprising:

a first jaw and a second jaw arranged in opposed configuration, one of said jaws being the mirror image of the other of said jaws, each of said jaws having gripping portions configured for enclosing a portion of an outer perimeter of an outer end of said line-post insulator;

first and second arms extending from said first and said second jaws, each of said arms having end fittings to permit engagement with a tension member of a power transmission system, each of said arms being configured for closure towards each other in juxtaposed relation; and means coupling said first arm with said second arm for retaining said first arm and said second arm in said juxtaposed relation as said first and said second jaws extend respectively from said first arm and said second arm to permit a holding of said line-post insulator.

10. A clamp according to claim 9 wherein each of said arms is bent away from a plane of said jaws to provide clearance of an electrical conductor carried by said line-post insulator.

* * * * *

UNITED STATES PATENT AND TRADEMARK OFFICE

CERTIFICATE OF CORRECTION

PATENT NO. : 4,523,054

DATED : June 11, 1985

INVENTOR(S) : Anthony C. Baker and Thomas A. Pinkham

It is certified that error appears in the above-identified patent and that said Letters Patent are hereby corrected as shown below:

On the title page and at the top of column 1, in the title of the invention, the word "Past" should read --Post--.

Signed and Sealed this

*Seventh* Day of *January 1986*

[SEAL]

*Attest:*

DONALD J. QUIGG

*Attesting Officer* *Commissioner of Patents and Trademarks*